United States Patent
Chae et al.

(10) Patent No.: US 8,818,666 B2
(45) Date of Patent: Aug. 26, 2014

(54) METHOD FOR CONTROLLING A DAMPER CLUTCH

(75) Inventors: Chang Kook Chae, Suwon-si (KR); Heungseok Lee, Seoul (KR); Sukil Oh, Suwon-si (KR); Wan Soo Oh, Yongin-si (KR); Jin Hyun Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/619,200

(22) Filed: Sep. 14, 2012

(65) Prior Publication Data

US 2013/0151099 A1    Jun. 13, 2013

(30) Foreign Application Priority Data

Dec. 9, 2011  (KR) .................. 10-2011-0132265

(51) Int. Cl.
  *F16D 48/06*   (2006.01)
  *G06F 17/00*   (2006.01)
  *B60W 20/00*   (2006.01)
  *F16H 61/14*   (2006.01)
  *F16H 61/04*   (2006.01)
  *F16H 61/38*   (2006.01)

(52) U.S. Cl.
  CPC ............. *B60W 20/00* (2013.01); *F16H 61/14* (2013.01); *F16H 61/04* (2013.01); *F16H 61/38* (2013.01)
  USPC .......................................................... 701/67

(58) Field of Classification Search
  CPC ........ B60W 20/00; F16H 61/04; F16H 61/14; F16H 61/38
  USPC ................................................... 701/51, 67
  See application file for complete search history.

(56) References Cited

U.S. PATENT DOCUMENTS

| | | | | |
|---|---|---|---|---|
| 4,171,029 A | * | 10/1979 | Beale | 180/54.1 |
| 4,471,863 A | * | 9/1984 | Lech, Jr. | 192/213.11 |
| 4,627,312 A | * | 12/1986 | Fujieda et al. | 477/124 |
| 4,943,920 A | * | 7/1990 | Hiramatsu et al. | 701/51 |
| 5,045,027 A | * | 9/1991 | Larsen | 464/63.1 |
| 5,168,971 A | * | 12/1992 | Kovac | 192/30 V |
| 5,598,334 A | * | 1/1997 | Shin et al. | 701/51 |
| 5,687,828 A | * | 11/1997 | Ament et al. | 192/213.2 |
| 5,752,894 A | * | 5/1998 | Fischer | 477/169 |
| 5,884,740 A | * | 3/1999 | Sudau et al. | 192/70.17 |
| 6,132,335 A | * | 10/2000 | Fischer | 477/169 |

(Continued)

FOREIGN PATENT DOCUMENTS

| | | |
|---|---|---|
| JP | 09-287658 A | 11/1997 |
| JP | 2001-141049 A | 5/2001 |

(Continued)

*Primary Examiner* — Calvin Cheung
*Assistant Examiner* — Allen Quillen
(74) *Attorney, Agent, or Firm* — Morgan, Lewis & Bockius LLP (57) ABSTRACT

A method for controlling a damper clutch may include determining whether the damper clutch is in a slip or lock-up state in a driving state of a vehicle, determining whether a condition of the vehicle is within a predetermined resonant range, determining whether a torque of the vehicle is within a predetermined resonant torque range, detecting a subharmonic vibration when the damper clutch is in the slip or lock-up state, the condition of the vehicle is within the predetermined resonant range, and the torque of the vehicle is within the predetermined resonant torque range, and controlling the damper clutch to slip or be open when the subharmonic vibration is larger than a predetermined value.

4 Claims, 6 Drawing Sheets

(56) References Cited

U.S. PATENT DOCUMENTS

| | | | |
|---|---|---|---|
| 6,316,086 B1 * | 11/2001 | Beier et al. | 428/293.4 |
| 6,364,807 B1 * | 4/2002 | Koneda et al. | 477/5 |
| 6,666,313 B2 * | 12/2003 | Gochenour et al. | 192/55.61 |
| 7,010,405 B2 * | 3/2006 | Furuichi et al. | 701/51 |
| 7,222,011 B2 * | 5/2007 | Smith et al. | 701/51 |
| 7,286,922 B1 * | 10/2007 | Fischer et al. | 701/51 |
| 7,346,442 B2 * | 3/2008 | Higashimata et al. | 701/67 |
| 7,547,981 B2 * | 6/2009 | Savant et al. | 290/1 R |
| 7,610,137 B2 * | 10/2009 | Kwon | 701/51 |
| 7,627,411 B2 * | 12/2009 | Kuwahara et al. | 701/55 |
| 7,682,282 B2 * | 3/2010 | Kamm et al. | 475/277 |
| 7,717,248 B2 * | 5/2010 | Reuschel | 192/54.4 |
| 8,000,868 B2 * | 8/2011 | Kurrle et al. | 701/67 |
| 8,010,258 B2 * | 8/2011 | Tanaka et al. | 701/48 |
| 8,016,708 B2 * | 9/2011 | Diosi et al. | 475/276 |
| 8,087,508 B2 * | 1/2012 | Hedman et al. | 192/213.1 |
| 8,161,739 B2 * | 4/2012 | Degler et al. | 60/338 |
| 8,219,303 B2 * | 7/2012 | Schwenke et al. | 701/111 |
| 8,226,525 B2 * | 7/2012 | Swales et al. | 477/3 |
| 8,256,562 B2 * | 9/2012 | Robinette et al. | 180/291 |
| 8,272,367 B2 * | 9/2012 | Shikama et al. | 123/436 |
| 8,276,723 B2 * | 10/2012 | Verhoog et al. | 192/3.29 |
| 8,332,111 B2 * | 12/2012 | McDonnell et al. | 701/68 |
| 8,359,144 B2 * | 1/2013 | Morris et al. | 701/51 |
| 8,370,051 B2 * | 2/2013 | Pursifull et al. | 701/112 |
| 8,387,729 B2 * | 3/2013 | Baumann et al. | 180/65.245 |
| 8,452,469 B2 * | 5/2013 | Otokawa | 701/22 |
| 2003/0183467 A1 * | 10/2003 | Kozarekar | 188/380 |
| 2004/0034460 A1 * | 2/2004 | Folkerts et al. | 701/54 |
| 2004/0260444 A1 * | 12/2004 | Winkelmann et al. | 701/67 |
| 2007/0068759 A1 * | 3/2007 | Koppitz et al. | 192/3.3 |
| 2011/0048836 A1 * | 3/2011 | Robinette et al. | 180/300 |
| 2011/0192691 A1 * | 8/2011 | Murata et al. | 192/3.3 |
| 2011/0240432 A1 * | 10/2011 | Takikawa et al. | 192/3.29 |
| 2011/0259702 A1 * | 10/2011 | Sudau et al. | 192/85.23 |
| 2011/0304220 A1 * | 12/2011 | Whitehead | 307/104 |
| 2012/0083953 A1 * | 4/2012 | Izawa et al. | 701/22 |
| 2012/0091934 A1 * | 4/2012 | Lindberg | 318/400.23 |
| 2012/0149518 A1 * | 6/2012 | Kimes | 475/5 |
| 2012/0160023 A1 * | 6/2012 | Johnson et al. | 73/116.06 |
| 2012/0196714 A1 * | 8/2012 | Murata | 475/149 |
| 2012/0205213 A1 * | 8/2012 | Sudau et al. | 192/3.33 |
| 2012/0220380 A1 * | 8/2012 | Murata | 464/68.3 |
| 2012/0234131 A1 * | 9/2012 | Robinette et al. | 74/572.2 |
| 2012/0234279 A1 * | 9/2012 | Robinette et al. | 123/179.25 |
| 2012/0325614 A1 * | 12/2012 | Yamashita | 192/70.14 |
| 2013/0080001 A1 * | 3/2013 | Cousins et al. | 701/54 |
| 2013/0113308 A1 * | 5/2013 | Dogel | 310/51 |

FOREIGN PATENT DOCUMENTS

| | | |
|---|---|---|
| JP | 2002-205576 A | 7/2002 |
| JP | 2002-213603 A | 7/2002 |
| KR | 10-0645551 B1 | 11/2006 |
| KR | 10-0645577 B1 | 11/2006 |
| KR | 1020110029821 A | 3/2011 |

* cited by examiner

METHOD FOR CONTROLLING A DAMPER CLUTCH

CROSS-REFERENCE TO RELATED APPLICATION

The present application claims priority to Korean Patent Application No. 10-2011-0132265 filed on Dec. 9, 2011, the entire contents of which is incorporated herein for all purposes by this reference.

BACKGROUND OF THE INVENTION

1. Field of the Invention

The present invention relates to a method for controlling a damper clutch. More particularly, the present invention relates to a method for controlling a damper clutch which can effectively eliminate unusual vibration of an engine by controlling a damper clutch of a torque converter.

2. Description of Related Art

A torque converter of a vehicle such as a hydraulic torque converter includes an impeller that rotates by receiving a driving force of an engine, a turbine that rotates by a fluid discharging from the impeller, and a stator (or reactor) that increases a torque changing rate by making a return current of the impeller for heading to a rotating direction of the impeller.

In the torque converter, the impeller is fixed at and rotates with a front cover thereof which is a rotating body of an input side, and causes an inner fluid to flow to the turbine. As a result, a torque is transmitted from the rotating body of the input side to a rotating body of an output side.

Further, a damper clutch is disposed in a space between the front cover and the turbine so as to directly and selectively connect them to each other for directly transmitting torque. As a result, the damper clutch plays a role in directly transmitting rotating power of the engine to the turbine.

Figure 6:
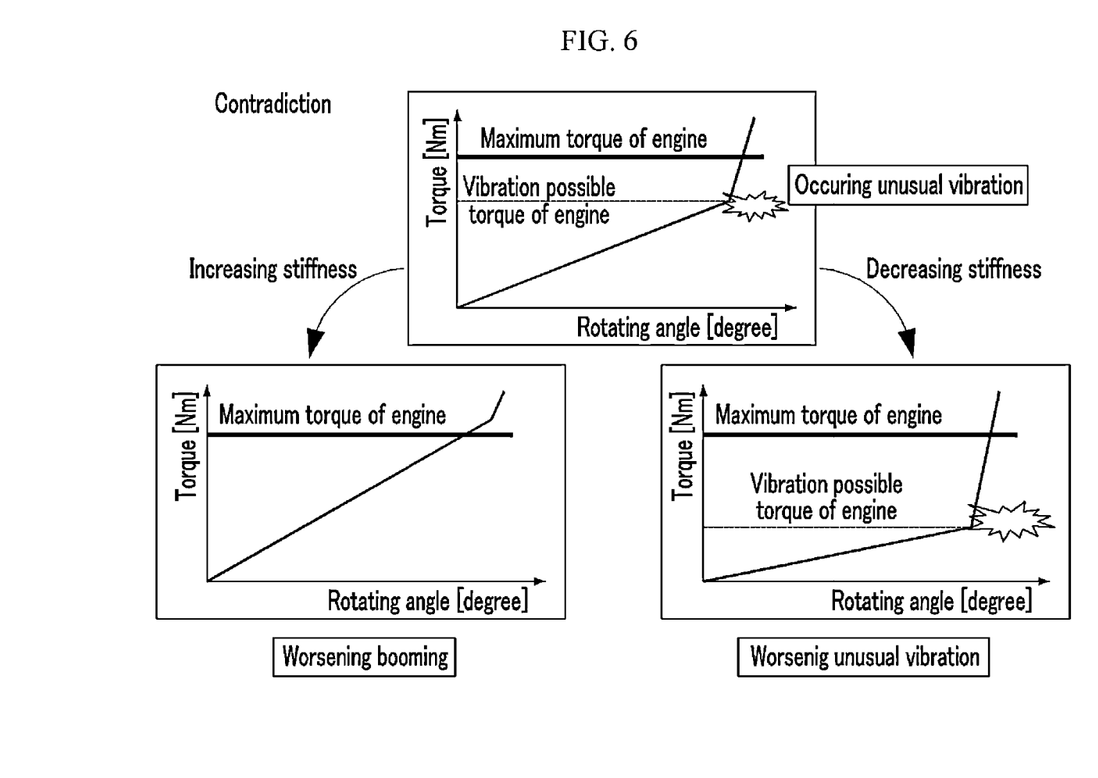
FIG. 6 is a schematic view of a contradiction between unusual vibration and booming.

Particularly, as shown in FIG. 6, if the damper clutch has a 2-stage stiffness structure, unusual subharmonic vibration can occur at the boundary of the 2-stage stiffness when engine torque is inputted such that a serious problem may occur in the vehicle body.

Figure 1:
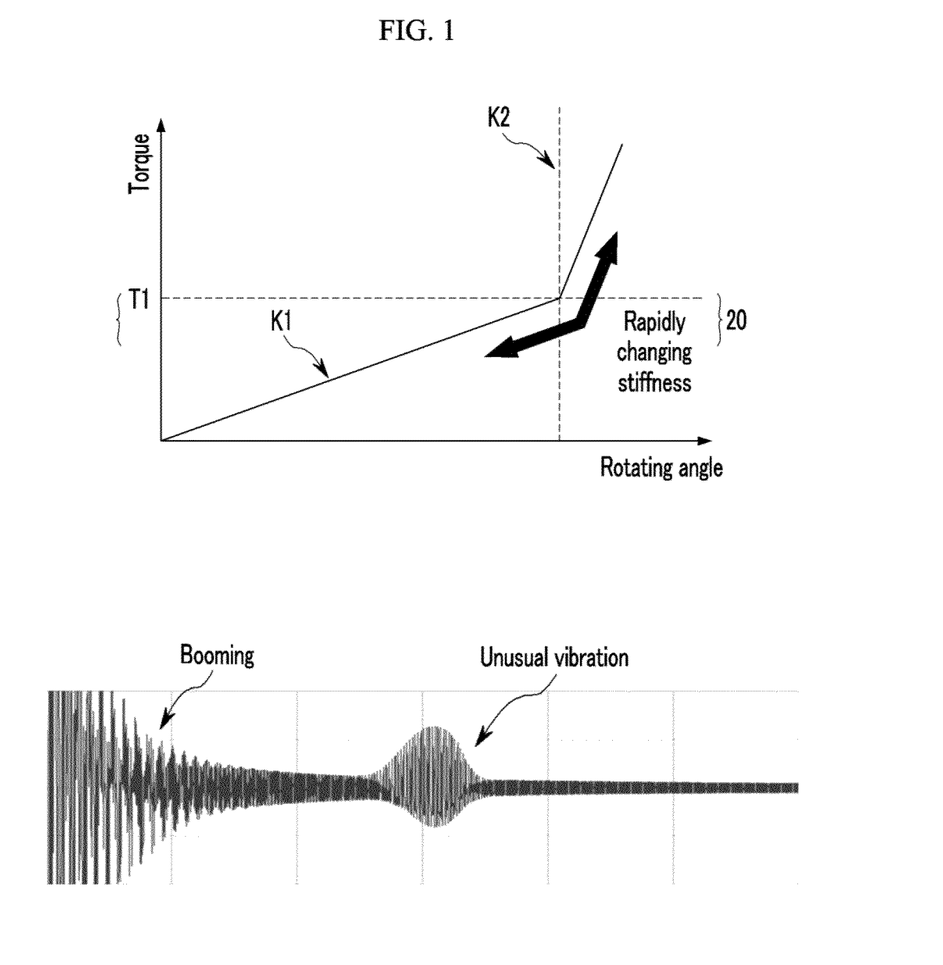
FIG. 1 is an experiment graph of unusual vibration and booming according to a stiffness change of a damper clutch

To solve this problem, if the stiffness of the damper clutch having the 2-stage stiffness structure increases, then a large booming sound arises such that noise-vibration-harshness (NVH) of the engine becomes worse and fuel efficiency deteriorates, as shown in FIG. 6. On the other hand, if the stiffness of the damper clutch having the 2-stage stiffness structure decreases, then the booming can be improved but the unusual vibration becomes worse. Therefore there is a contradiction between booming and unusual vibration. As shown in FIG. 1, the unusual vibration range and the booming range are different such that it is difficult to solve the problem by changing stiffness of the damper clutch having the 2-stage stiffness structure.

On the other hand, if the damper clutch has a multi-stage stiffness structure so as to settle the problem, then unusual vibration and booming can be improved somewhat, but it is actually difficult to apply to the damper clutch since the multi-stage stiffness structure is embodied under some limited design conditions such as maximum torque, angle of torsion, etc.

The information disclosed in this Background of the Invention section is only for enhancement of understanding of the general background of the invention, and should not be taken as an acknowledgement or any form of suggestion that this information forms the prior art already known to a person skilled in the art.

BRIEF SUMMARY

Various aspects of the present invention are directed to providing a method for controlling a damper clutch having advantages of improving fuel efficiency and noise-vibration-harshness (NVH) of an engine by effectively eliminating unusual vibration, and stably maintaining fuel efficiency and noise vibration harshness (NVH) of the engine by retaining strength against a change of stiffness caused by durability deterioration, and deviation of stiffness of the damper clutch.

In an aspect of the present invention, a method for controlling a damper clutch, may include determining whether the damper clutch is in a slip or lock-up state in a driving state of a vehicle, determining whether a condition of the vehicle is within a predetermined resonant range, determining whether a torque of the vehicle is within a predetermined resonant torque range, detecting a subharmonic vibration when the damper clutch is in the slip or lock-up state, the condition of the vehicle is within the predetermined resonant range, and the torque of the vehicle is within the predetermined resonant torque range, and controlling the damper clutch to slip or be open when the subharmonic vibration is larger than a predetermined value.

The controlling the damper clutch to slip or be open may include controlling the damper clutch to slip when the subharmonic vibration is larger than a predetermined first index value, and controlling the damper clutch to open when the subharmonic vibration which is detected after controlling the damper clutch to slip is larger than a predetermined second index value.

The resonant range of the vehicle is set by considering a design value or an experimental value of a driving system of the vehicle including an engine.

The resonant range of the vehicle is an engine speed range which is preset according to a gear speed of the vehicle.

The damper clutch may have a 2-stage stiffness structure by applying dual damper springs.

The resonant torque range is a predetermined range that may include a torque corresponding to a break point of stiffness of the damper clutch.

According to a method for controlling a damper clutch according to the present invention, fuel efficiency and noise-vibration-harshness (NVH) of an engine may be improved, and fuel efficiency and NVH may be stably maintain by retaining strength against a change of stiffness caused by a durability deterioration and deviation of stiffness of the damper clutch.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will now be described in detail with reference to the accompanying drawings.

Figure 2:
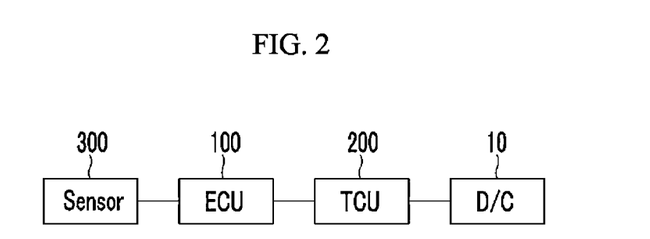
FIG. 2 is schematic diagram of a damper clutch control system according to an exemplary embodiment of the present invention.
Figure 3:
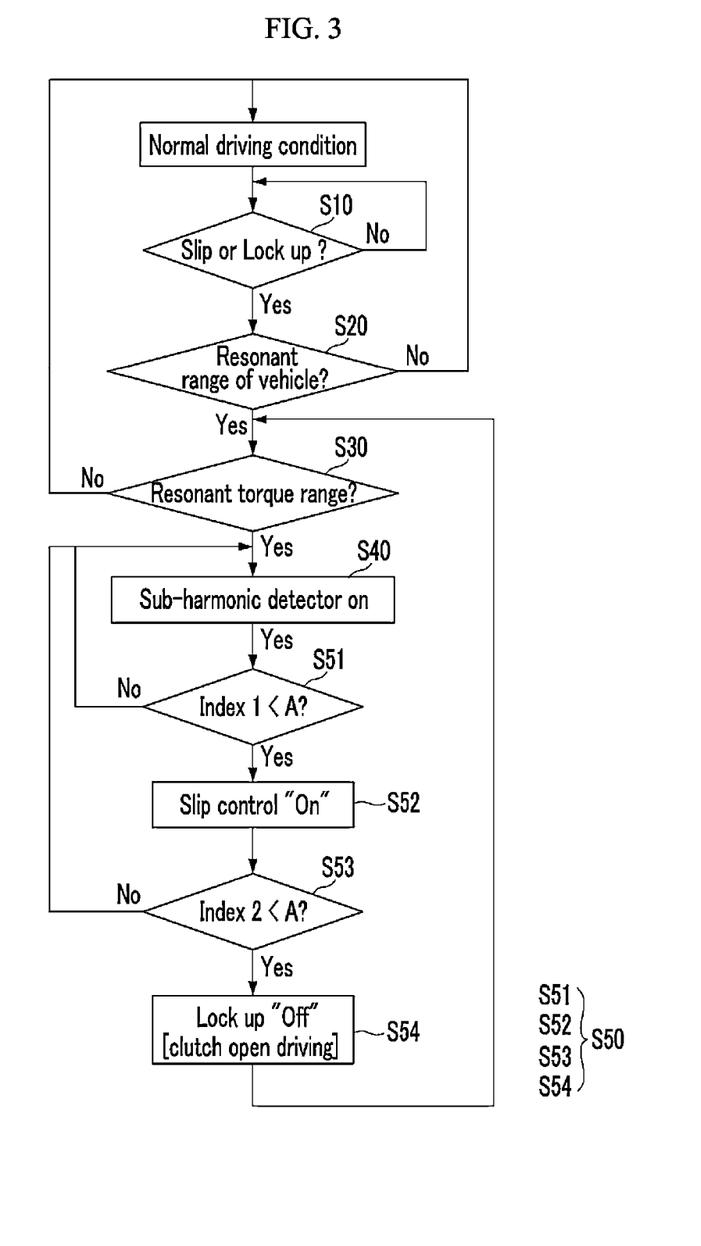
FIG. 3 is a flowchart of a method for controlling a damper clutch according to an exemplary embodiment of the present invention.

FIG. 2 is schematic diagram of a damper clutch control system according to an exemplary embodiment of the present invention, and FIG. 3 is a flowchart of a method for controlling a damper clutch according to an exemplary embodiment of the present invention.

As shown in FIG. 2 to FIG. 3, a method for controlling a damper clutch according to an exemplary embodiment of the present invention may include determining whether the damper clutch is in a slip or lock-up state in a driving state of a vehicle at step S10, determining whether a condition of the vehicle is within a predetermined resonant range at which an unusual vibration of the damper clutch may occur at step S20, determining whether a torque of the vehicle is within a predetermined resonant torque range at which an unusual vibration of the damper clutch may occur at step S30, detecting a subharmonic vibration (A) when the damper clutch is in a slip or lock-up state, the condition of the vehicle is within the resonant range, and torque of the vehicle is within the resonant torque range at step S40, and controlling the damper clutch to slip or open when the subharmonic vibration is larger than a predetermined value at step S50.

At step S10, an electronic control unit (ECU) 100 determines whether a slip or lock-up situation occurs in the damper clutch 10 when the vehicle is in a normal driving condition. The damper clutch 10 may have a 2-stage stiffness structure. This is because there is a high probability of unusual vibration when the damper clutch is in a small slip state or in a lock-up state.

Figure 4:
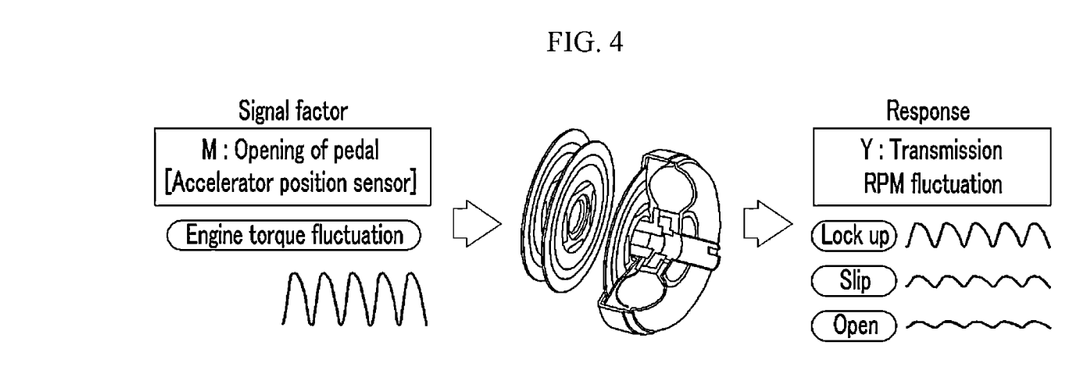
FIG. 4 is a schematic view of a state of a damper clutch in relation to a torque fluctuation of an engine.

As shown in FIG. 4, torque of an engine is changed by a throttle opening of the vehicle, and a damper clutch 10 responds differently such as through slip, lock-up, or open according to the torque change. The unusual vibration may occur according to a change of stiffness when the damper clutch 10 is locked up, and the unusual vibration may not occur when the damper clutch 10 is open. In the case of the damper clutch 10 slip, an amount or degree of slip determines whether the unusual vibration occurs. In general, if the amount of slip of the damper clutch 10 becomes smaller, the possibility of the unusual vibration becomes larger.

In some exemplary embodiments, the damper clutch 10 may have a 2-stage stiffness structure by applying dual damper springs. As shown in FIG. 1 and FIG. 6, the damper clutch 10 which has 2-stage stiffness structure has a limitation in making the first stiffness (K1) small, and a drastic change of stiffness between the first stiffness (K1) and second stiffness (K2) causes a vibration reflecting effect in which an unusual resonant vibration occurs. The unusual vibration is a nonlinear vibration that may produce a fatal problem to the vehicle body.

Particularly, the probability of occurrence of the unusual vibration is highest when the damper clutch is locked up such that the electronic control unit (ECU) 100 or transmission control unit (TCU) 200 determines whether the damper clutch is locked up.

Meanwhile, the possibility of occurrence of the unusual vibration in the slip state of the damper clutch 10 is lower than in the lock-up state, but the slip state may be the same state as the lock-up state when the amount of slip is small. Therefore the ECU 100 or TCU 200 determines whether the damper clutch is in a slip state.

In some exemplary embodiments, a degree of slip that has a possibility causing the unusual vibration may be predetermined, and the condition of the step S10 is satisfied when an amount of slip of the damper clutch 10 is in the predetermined degree of slip.

The condition of the step S10 is not satisfied when the vehicle drives in the damper clutch open state by releasing lock-up, since the unusual vibration does not occur in the damper clutch open state.

At step S20, as shown in FIG. 3, the electronic control unit (ECU) 100 of the vehicle determines whether it is within a predetermined resonant range at which an unusual vibration of the damper clutch may occur.

A particular condition that may produce the unusual vibration can exist not only in the damper clutch but also in the vehicle in which the particular condition is considered at the step S20. As shown in FIG. 1, the unusual vibration occurs in a particular range of revolutions per minute (RPM). The particular range may be set as the resonant range of the vehicle.

In some exemplary embodiments, the resonant range of the vehicle can be set from an experimental value or a designed value of a driving system of the vehicle including the engine.

Further, in some exemplary embodiments, the resonant range of the vehicle is an engine speed range which is preset according to a gear speed of the vehicle. The gear speed information may be transmitted from the transmission control unit (TCU) 200 to the electronic control unit (ECU) 100, and rotation speed information may be measured by a rotation speed sensor and transmitted from the rotation speed sensor to the electronic control unit (ECU). Meanwhile, a map table which has a range of rotation speed of the engine corresponding to each gear speed may be stored in the electronic control unit (ECU) 100 in advance, and the electronic control unit (ECU) 100 determines whether the measured engine rotation speed is in the predetermined range of rotation speed of the map table by comparing the gear speed and the engine rotation speed transmitted from the TCU 200 and the rotation speed sensor with the map table.

As mentioned above, the resonant range of the vehicle refers to a range that can produce the unusual vibration, such that the resonant range of the vehicle can be preset by detecting and storing the engine speed range in each gear speed in advance. For instance, the electronic control unit (ECU) 100 determines that the vehicle is in the resonant range if the measured engine rotation speed is in the predetermined RPM range of the map table when the gear is fifth speed.

The RPM range of the map table can be set as the same range or a different range according to each gear speed.

At step S30, as shown in FIG. 3, the ECU 100 determines whether a torque of the vehicle is within a predetermined resonant torque range at which the unusual vibration of the damper clutch 10 may occur. The rotation speed range of the engine in each gear speed as well as a torque range that can produce the unusual vibration may exist.

As shown in FIG. 1 and FIG. 2, the torque corresponding to the point that stiffness of a damper clutch which has 2-stage stiffness structure drastically changes between K1 and K2 is T1. This means that if torque becomes T1, the unusual resonant vibration may occur.

Therefore, the resonant torque range 20 that can produce the unusual vibration may be predetermined by a torque range near the T1 shown if FIG. 1. In some exemplary embodiment, the resonant torque range 20 may be set by an experiment or an analysis with respect to the unusual vibration and torque.

In some exemplary embodiments, the resonant torque range 20 may also be set as the same range or a different range in each gear speed. A torque that can produce the unusual vibration in each gear speed is generally in a particular percentage (%) range of the maximum torque in each gear speed. Therefore, the resonant torque range 20 may be set by considering the particular percentage range.

At step S40, as shown in FIG. 3, a sensor 300 detects a subharmonic vibration when the damper clutch is in a slip or lock-up state, the condition of the vehicle is within the resonant range, and torque of the vehicle is within the resonant torque range.

The sensor 300 of the vehicle detects the subharmonic at step S40 when all the conditions of steps S10, S20, and S30 are satisfied. In some exemplary embodiments, the subharmonic vibration (A) may be detected not only by using some device such as the sensor 300 but also by converting the output shaft rotation speed of the transmission of the vehicle using the electronic control unit (ECU) 100 or transmission control unit (TCU) 200.

At step S50, the transmission control unit (TCU) 200 controls the damper clutch 10 to slip or be open when the subharmonic vibration is larger than the predetermined index value. The unusual vibration can occur in the vehicle in the above case in which, if the damper clutch 10 is in the lock-up state, the transmission control unit (TCU) 200 changes the lock-up state to a slip state or open state for preventing the unusual vibration.

Meanwhile, the unusual vibration can occur in the slip state of the damper clutch according to an amount or degree of slip Therefore, the transmission control unit (TCU) 200 may also control the damper clutch 10 in this case for making the amount of slip larger or making the damper clutch 10 to be in open state so as to prevent the unusual vibration.

The present slip state may be a state that can produce the unusual vibration so that the TCU 200 controls the damper clutch to enlarge a degree of slip or changes the damper clutch to be open, and as a result, damping of the damper clutch increases, the vibration of the engine is absorbed thereby, and the unusual vibration is prevented.

The index value may be predetermined by an experiment or an analysis.

In some exemplary embodiments, the index value may be predetermined by using an output shaft rotation speed of the transmission.

In general, the transmission control unit (TCU) 200 is designed to receive an output speed from a pulse generator B (PGB) sensor which detects output speed of an automatic transmission, and therefore the output shaft rotation speed can be calculated by using the PGB sensor.

In the case of an inline 4-cylinder (I4) engine, the crankshaft rotates twice while the 4 cylinders finish 4 strokes such as an intake stroke, a compression stroke, an explosion stroke, and an exhaust stroke. Therefore, the main firing element can be defined as C2 (C4/2), and the index value may be defined as C1 that is half of the C2.

In the same manner, in the case of an inline 6-cylinder (I6) engine or a V6 engine, the crankshaft rotates twice while the 6 cylinders finish 4 strokes such as the intake stroke, the compression stroke, the explosion stroke, and the exhaust stroke. Therefore, the main firing element can be defined as C3 (C6/2), and the index value may be defined as C1.5 that is half of the C3.

In the same manner, in the case of a V8 engine, it may use C2 for an index value that is half of the C4.

However, the above-mentioned index value determination method is but one method for determining the index value, therefore the present invention is not limited to the above mentioned index value determination method.

In some exemplary embodiment, the step S50 of controlling the damper clutch 10 to slip or be open may be divided into multiple steps as shown in FIG. 3. The controlling of the damper clutch 10 to slip or be open may include steps S51 to S54. At step S51, the TCU 200 determines whether the subharmonic vibration (A) is larger than a predetermined first index value at step S51. At step S52, the TCU 200 controls the damper clutch 10 to slip when the subharmonic vibration (A) is larger than the predetermined first index value (Index 1). At step S53, the TCU 200 determines whether a subharmonic vibration (A) redetected by the sensor after controlling the damper clutch 10 to slip at step S52 is larger than a predetermined second index value (Index 2). At step S54, the TCU 200 controls the damper clutch to open when the subharmonic vibration (A) detected after controlling the damper clutch to slip is larger than the predetermined second index value (Index 2).

For instance, if a damper clutch 10 is in the lock-up state, the TCU 200 controls the damper clutch 10 to slip at step S52 when the subharmonic vibration (A) detected by the sensor 300 is larger than the first Index value (Index 1) at step S51, and the TCU 200 controls the damper clutch 10 to open so as to prevent the unusual vibration at step S54 when the subharmonic vibration (A) redetected by the sensor 300 after controlling the damper clutch to slip is larger than the predetermined second index value (Index 2) at step S53.

The first index value (Index 1) or the second index value (Index 2) may be predetermined by an experiment, and the first index value (Index 1) or the second index value (Index 2) may be half of the main firing element of the engine.

A method for controlling the damper clutch according to an exemplary embodiment of the present invention may prevent the unusual vibration by changing the state of the damper clutch to slip or be open when the stiffness of the damper clutch which has a 2-stage stiffness structure drastically changes as a result of the unusual vibration.

Figure 5:
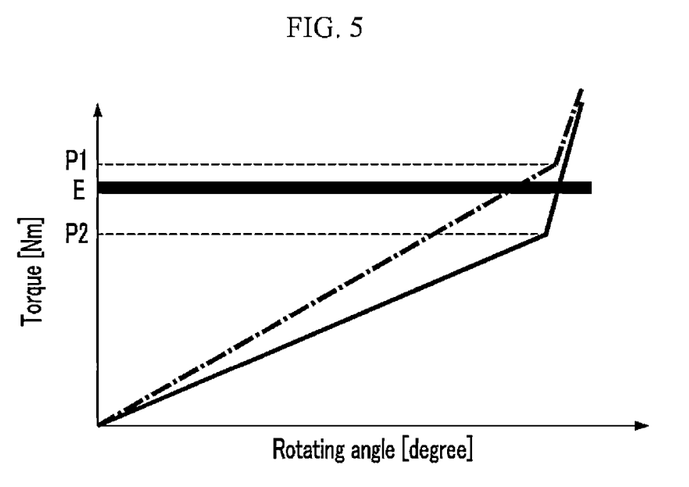
FIG. 5 is a graph for explaining a design of a damper clutch having low stiffness.

Meanwhile, the conventional art increases the stiffness of the damper clutch which has the 2-stage stiffness structure for making the torque (P1) of the boundary point larger than the maximum torque (E) of the engine, as shown in FIG. 5, so as to prevent the unusual vibration, but as a result the booming is worsened, as shown in FIG. 6.

However, the method for controlling a damper clutch according to an exemplary embodiment of the present invention may prevent the unusual vibration when the torque (P2) of the boundary point is smaller than the torque (E) of the engine. As a result, according to an exemplary embodiment of the present invention, the damper clutch may be designed to have low stiffness such that the booming can be prevented as well.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a damper clutch in a torque converter of a combustion engine using only a power of an engine, comprising:
   determining, by an electronic control unit (ECU) or a transmission control unit (TCU), whether the damper clutch is in a slip or lock-up state in a driving state of a vehicle;
   determining whether a condition of the vehicle is within a predetermined resonant range;
   determining whether a torque of the vehicle is within a predetermined resonant torque range;
   detecting, by a sensor, a subharmonic vibration when the damper clutch is in the slip or lock-up state, the condition of the vehicle is within the predetermined resonant range, and the torque of the vehicle is within the predetermined resonant torque range; and
   controlling, by the electronic control unit (ECU) or the transmission control unit (TCU), the damper clutch to slip or be open when the subharmonic vibration is larger than a predetermined value;
   wherein the damper clutch has a 2-stage stiffness structure by applying dual damper springs, and the resonant torque range is a predetermined range that includes a torque corresponding to a break point of stiffness of the damper clutch; and
   wherein the controlling of the damper clutch to slip or be open includes controlling the damper clutch to slip when the subharmonic vibration is larger than a predetermined first index value.

2. The method of claim 1, wherein the controlling the damper clutch to slip or be open includes controlling the damper clutch to open when the subharmonic vibration which is detected after controlling the damper clutch to slip is larger than a predetermined second index value.

3. The method of claim 1, wherein the resonant range of the vehicle is set by considering a design value or an experimental value of a driving system of the vehicle including an engine.

4. The method of claim 1, wherein the resonant range of the vehicle is an engine speed range which is preset according to a gear speed of the vehicle.

* * * * *